United States Patent [19]

Vicard

[11] 4,135,965

[45] Jan. 23, 1979

[54] PROCESS AND APPARATUS FOR THE TREATMENT OF LIQUIDS CONTAINING SOLID PARTICLES

[75] Inventor: Jean-François Vicard, Lyons, France

[73] Assignee: Societe Lab, Villeurbanne, France

[21] Appl. No.: 759,607

[22] Filed: Jan. 14, 1977

[30] Foreign Application Priority Data

Jan. 15, 1976 [FR] France .................................. 76 01498

[51] Int. Cl.$^2$ .............................................. B01D 1/24
[52] U.S. Cl. ..................... 159/4 CC; 159/4 A; 159/4 MS; 159/16 R; 159/13 A; 159/13 C; 159/49; 426/471; 23/313 R; 159/DIG.26
[58] Field of Search .................. 159/16 R, 16 A, 13 B, 159/13 C, 13 A, 4 A, 4 CC, 4 MS, 47 WL, 48, 49, DIG. 26; 23/314, 313

[56] References Cited

U.S. PATENT DOCUMENTS

| 2,010,101 | 8/1935 | MacLachlan | 159/4 |
| 2,578,315 | 12/1951 | Parker | 159/13 C |
| 3,387,929 | 6/1968 | Beltz et al. | 159/4 A |
| 3,785,769 | 3/1957 | Pollock | 23/314 |
| 3,870,585 | 3/1975 | Kearns et al. | 159/16 R |
| 3,920,505 | 11/1975 | Helleur | 159/13 C |

FOREIGN PATENT DOCUMENTS 134764 12/1919 United Kingdom ........................ 159/4

Primary Examiner—Norman Yudkoff
Attorney, Agent, or Firm—Dowell & Dowell

[57] ABSTRACT

In a process and apparatus for the treatment of liquids containing solid particles, the mixture is first formed into a film to run down the walls of an enclosure having a frustro conical top wall and be subjected to a drying gas flow, and the partially dried mixture is then led back to a spray inlet to discharge as an atomized spray within the same enclosure for a second stage of drying, which may include combustion of solid particles, also within the same enclosure.

9 Claims, 2 Drawing Figures

PROCESS AND APPARATUS FOR THE TREATMENT OF LIQUIDS CONTAINING SOLID PARTICLES

The present invention refers to the drying and transformation of solid matter which is in the divided state in suspension in liquids with a view to obtaining a product which is dry or at least of liquid content reduced to any desired value. Depending upon the circumstances this product is considered either of value in itself, its recovery then constituting the object of the operation, or on the contrary as waste which should be destroyed in one way or another once it has been separated from the carrier liquid. An example of the first case is the manufacture of powdered milk. As regards the second, it is illustrated by the problem of waste water which either after or before prior treatment appears in the form of a more or less muddy liquid from which it is advisable to eliminate, in order to destroy it, the solid matter which it contains comprising an organic sludge capable of giving rise to phenomena of putrefaction, fermentation and the like.

Numerous means are known of extracting divided solids from a liquid in which they are in suspension. In particular a description may be found in the British Pat. No. 134,764 of a method in accordance with which a product is dried by making it pass through two chambers in succession, for concentration and final drying respectively. It has besides been proposed in the American Pat. No. 2,010,101 to concentrate milk by means of two chambers, the feeding of the liquid to the second chamber being carried out in such a way that it runs down the walls. These known methods need a bulky treatment plant, and they do not provide for the transformation of the solid matter finally collected, for example, its destruction by heat in the case of organic waste matter.

The invention aims on the contrary at achieving simply and with a simple and cheap treatment plant the drying of mixtures of liquid and solid matter and/or the transformation of the solids so recovered.

In accordance with the invention there is provided a method of partial or total drying and/or processing of mixtures of liquid and of solid particles, and especially the treatment of waste water which has been pretreated or not, this method being of the type in which operation is effected in two successive phases by first of all making the liquid run down the walls of an enclosure through which passes a suitable gas, and by then taking up the intermediate product so obtained and atomizing it from the bottom upwards into an enclosure through which also passes a suitable gas. The method is characterized in that the two operational phases are carried out inside a single chamber by taking care to atomize the intermediate product in such a way that the droplets or particles of it do not substantially come into contact with the walls of the chamber, and that the final product may be collected in the central portion of the bottom of the chamber, independently of the intermediate product.

In the case where the liquid being processed contains combustible particles there is advantageously provided in the single chamber an ignition burner which ensures combustion of the said particles in the gas provided which supports the combustion. This combustion may be carried out in counter-current with respect to the drying gas.

It is in addition possible to provide in the single chamber a polarizing and/or ionizing electrode with a view to ensuring agglomeration of the particles.

In addition the invention relates to a plant for putting into effect the above method. This plant, includes apparatus of the type having sidewalls which slope sufficiently that the liquid to be processed will run down them without breaking away from them, means for bringing this liquid against the top of these walls, means for bringing a suitable gas into contact with the liquid so running, means for collecting the intermediate product at the bottom of the said walls, means for atomizing this intermediate product vertically from the top downwards, means for bringing a suitable gas into contact with the droplets or particles of the atomized intermediate product, and means for discharging the final product so obtained as well as the spent gases, vapours and other products of reaction, the apparatus being particularly characterized in that it comprises a single process chamber surrounded at the sides by running walls, and in that said means for bringing the liquid to be processed against the top of the sidewalls of this chamber consist of a first nozzle of annular shape, suitable for emitting a sheet of this liquid which is sufficiently divergent to impinge itself against the said walls, and in that said means for atomizing into this single chamber the intermediate product collected at the bottom of the walls of the said chamber comprises of a second nozzle arranged inside the first and suitable for atomizing the intermediate product in a jet of low divergence orientated towards the bottom of the chamber and not coming into contact with its sidewalls, and in that said means for bringing the gas into the chamber comprises piping which rises from the bottom of the chamber to open out at a certain distance below the second nozzle, and in that said means for discharging the final product comprises a collector hopper arranged at the bottom of the chamber for collecting this product, the top edge of this hopper remaining spaced from the walls of the chamber.

The single chamber may contain one or a number of burners and may include an axial electrode above the outlet from the process gas feed pipe.

The attached drawing given by way of example will enable better understanding of the invention, the characteristics which it exhibits and the advantages which it is capable of obtaining.

Figure 1:
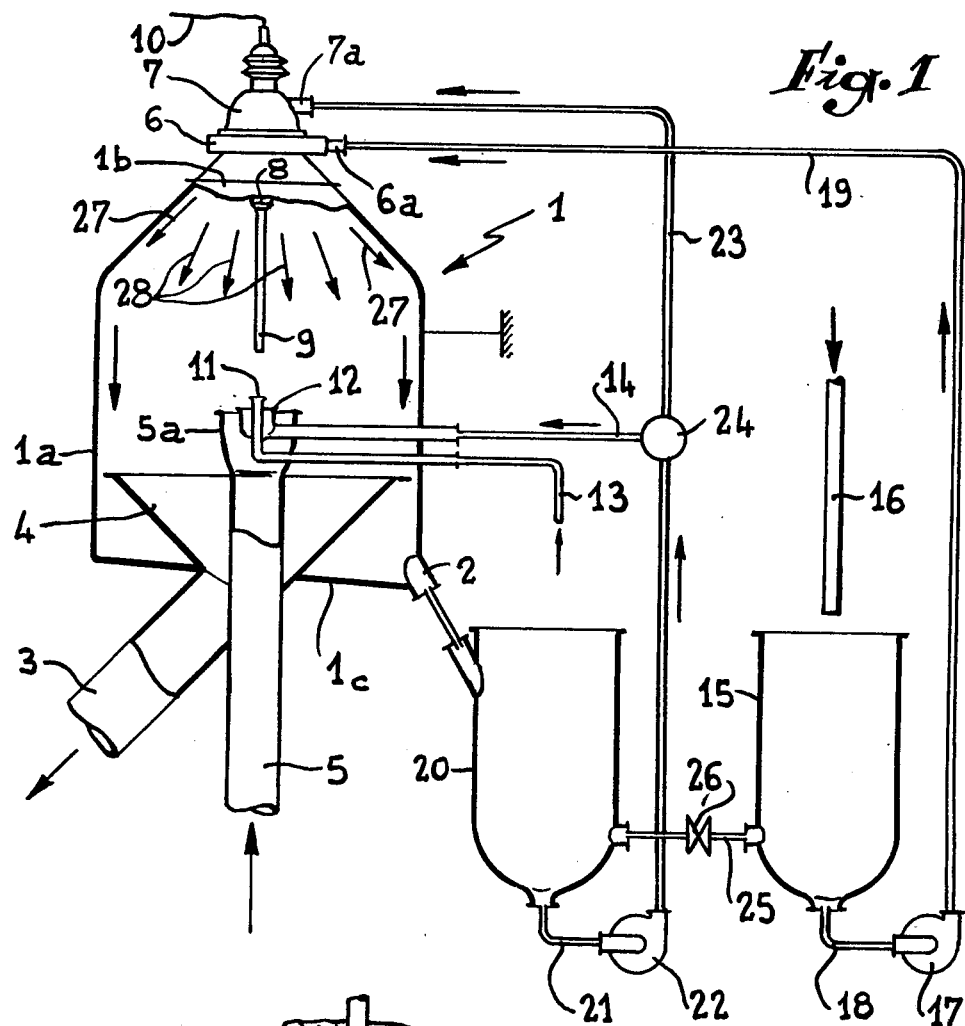
FIG. 1 is a diagrammatic view of apparatus in accordance with the invention for drying and transformation of solid matter contained in waste water.
Figure 2:
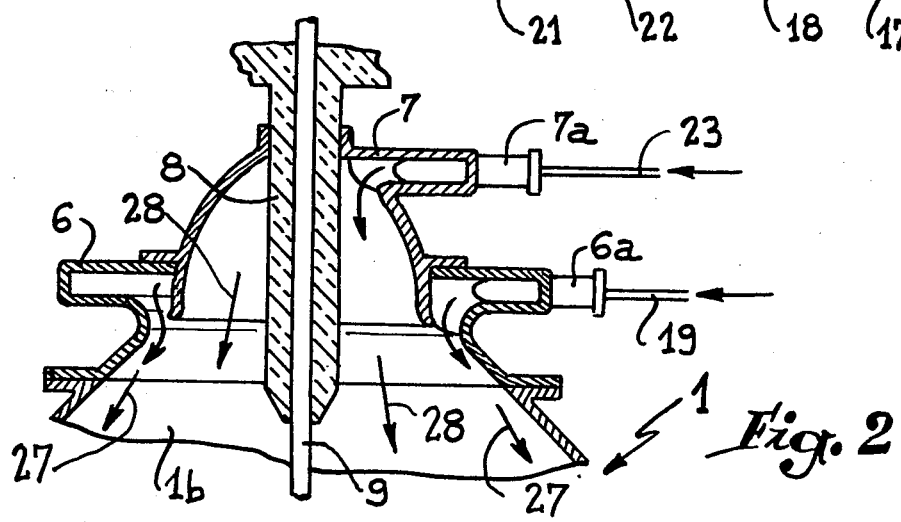
FIG. 2 is a detail section of the nozzle system.

The apparatus comprises a chamber 1 consisting of a main portion 1a of cylindrical shape with its axis vertical, a top conical end 1b and a bottom end 1c which slopes downwards in the direction of an outlet pipe stub 2. Through the bottom end 1c passes an obliquely orientated discharge chute 3 the inlet to which inside the chamber 1 is constituted by a frustoconical hopper 4 which spreads out upwards until it comes to a stop a short distance from the wall of the cylindrical portion 1a. Through the chute 3 passes a pipe 5 which rises axially into the chamber and ends in an enlarged head 5a.

The apex of the top conical end 1b is connected to a first nozzle 6 of annular overflowing-trough type fed by an injector pipe 6a orientated tangentially to the bottom of the trough so as to create in it a liquid ring revolving at high speed, which overflows in the downwards direction in the form of a sheet of uniform thickness which spreads out against the inner face of the portion 1b; the cone angle of the latter is designed to be less than the limit at which the liquid would break away from the wall under the effect of gravity. The sheet therefore runs down against the said wall, then against that of the cylindrical wall 1a and finally arrives on the bottom end 1c which because of its slope brings the liquid to the outlet pipe stub 2.

In order to avoid the possibility that the nozzle 6 might act as a centrifugal separator and concentrate the solid particles in the muddy liquid which is being fed to it, one may advantageously have its trough include an annular bottom in the form of a spiral so that the depth of this trough is reduced to zero immediately upstream of the injector pipe 6a.

Inside the annular nozzle 6 is mounted a second nozzle 7 which in turn is of annular shape and suitable for emitting a finely atomized jet having an angle of divergence which is sufficiently small for the atomized particles to be able to be collected by the collector device 4 without having come into contact with the wall of the cylindrical portion 1a. This nozzle may more particularly be of the type including a first annular chamber in which the liquid revolves at high speed in order to overflow into a second one in the form of a spread out cup. The tangential feedpipe for a nozzle of this kind is shown at 7a.

Concentrically with the nozzle 7 is arranged an insulator 8 which extends downwards and upwards beyond the assembly of the two nozzles 6,7 in order to support an axial electrode 9 which runs down into the chamber to stop at a certain distance above the head 5a. This electrode is fed by a conductor 10 at a voltage suitable for letting it play the part of a polarizer, with or without ionization.

The head 5a contains two burners 11 and 12 arranged concentrically with one another. The first is fed with liquid or gaseous fuel through a pipe 13 whilst the second through another pipe 14 receives a fraction of the concentrated sludge proceeding from the pipe stub 2 in the manner explained later. The assembly of these two burners 11,12 provides round it an annular passage for the flow of the drying gas, the pipe 5 being for the purpose of feeding this into the chamber 1.

The plant further comprises a first tank 15 to which the liquid sludge to be processed is brought through a pipe 16, a pump 17 which receives this sludge from the bottom of the tank 15 through a pipe 18 in order to deliver it into a pipe 19 which terminates at the injector pipe 6a to the first nozzle 6. A second tank 20 receives the concentrated sludge proceeding from the pipe stub 2. From the bottom portion of it leaves a pipe 21 which terminates at the inlet to a pump 22 which delivers the concentrated sludge into a pipe 23 connected to the injector pipe 7a to the second nozzle 7. In this pipe 23 a tap-off valve 24 is interposed, which enables a fraction of the flow of sludge to be sent to the burner 12 through the pipe 14.

Finally a pipe 25 is provided between the two tanks 15 and 20 with an adjuster valve 26.

With the plant described above there is furthermore associated a suitable source of drying gas such, for example, as an air heater. This source is connected to the pipe 5, the air or other gas employed being discharged through the chute 3 after having whirled round the chamber 1.

Operation is as follows:

The waste water, which may have been pretreated or not and which may have undergone or not an operation of filtration and/or decantation, and which appears in the form of liquid sludge, is run through the pipe 16 into the tank 15 which is intended to form a flow-regulator buffer. The pump 17 withdraws it through the piping 18 and delivers it through the pipe 19 to the inlet 6a to the first nozzle 6. As indicated above, the liquid leaving this nozzle spreads out in a uniform sheet against the walls of the chamber 1 in the manner indicated by the arrows 27, to reach the tank 20 through the pipe stub 2. It will be understood that a large fraction of the water from the aforesaid sheet is evaporated upon contact with the hot air or other drying gas which is circulating in the chamber, so that the sludge collected in the tank 20 is considerably more concentrated than that fed to the plant.

The sludge thus concentrated is taken off by the pump 22 through the pipe 21 and delivered to the nozzle 7 through the pipe 23. As has been clearly stated, this nozzle is designed to atomize the sludge in the form of a jet of relatively small divergence which consequently does not reach the walls of the chamber, as shown by the arrows 28. This jet meets in contraflow the drying gas leaving the head 5a, with which it is intimately mixed, which has the effect of drying the atomized particles further.

The burner 11 has in addition been ignited and the particles so dried burn or are gasified upon contact with the flame from it to the extent to which they are combustible (in fact the particles in suspension in waste water are to a great extent combustible). The dried particles or their residues are finally collected by the hopper 4 and discharged through the chute 3. It should be observed that the gasification or combustion of the particles is carried out in countercurrent with respect to the air which supports combustion, which constitutes the solution most favourable to complete combustion.

When the concentration of the sludge contained in the tank 20 is sufficiently high one can through the valve 24 send to the burner 12 a fraction of the flow delivered through the pipe 23. The sludge thus tapped off burns upon contact with the flame of the burner 11, amplifying the flame of the latter.

It will be understood moreover that the flame from the burners 11 and 12 releases a considerable amount of heat and that consequently the walls of the chamber are continuously heated, which improves the evaporation of the sheet which is running down them and increases the concentration of the sludge reaching the tank 20. This release of heat may in certain cases be sufficient for one to be able to dispense with any thermal contribution by the drying gas fed through the pipe 5.

The pipe 25 under any circumstances enables a fraction of the sludge collected in the tank 20 to be recycled to the tank 15 when its concentration is judged insufficient. In order to provide for recycling an auxiliary pump may be inserted in the pipe 25 or the two tanks 15 and 20 arranged at different levels.

As regards the electrode 9, it acts upon the atomized particles from the nozzle 7 and upon those of the liquid running down from the nozzle 6 in order to agglomerate them and so facilitate the final collection from the hopper 4.

Of course the plant described is equally suitable when it is not desired to burn the dried particles. It is sufficient either not to provide the burners 11,12 or to leave them turned off. In that case the drying gas may be arranged to be inert (gases of combustion, for example).

It will further be understood that the tanks 15 and 20 are provided only for regulating the circulation of the sludge in the plant in spite of irregularities in the feed through the pipe 16 as well as variations in adjustment proceeding from the pumps and the recycling. In the case of steady conditions these tanks might be dispensed with.

It must furthermore be understood that the foregoing description has been given only by way of example and that it in no way restricts the scope of the invention from which there would be no departure in replacing the details of execution described by any other equivalent ones. For example it may be imagined that it would be possible to recycle into the pipe 5 a fraction of the drying gas leaving through the chute 3. The burner 12 might be fed with dried particles or with gases proceeding from the decomposition or gasification of the solids within the apparatus.

On the other hand although one has above been talking about processing of waste water the invention is in no way restricted to this particularly field. In particular it may be employed for gasifying sludges containing a high proportion of carbonaceous matter such, for example, as tailings.

In this case the drying gas must contain a proportion of oxygen which is just sufficient to bring about the reaction of dissociation of water in contact with the carbon particles so as to obtain at the outlet from the chute 3 on the one hand very fine cinders, and on the other hand a combustible gas capable of being made use of.

I claim:

1. The method of heat treating a mixture of solids contained within a liquid by contacting the mixture with a flow of treatment gas into a chamber having side walls extending around the central space within the chamber, the method including the concurrently performed steps of:
   (a) forming a film of the mixture and running the mixture down the side walls while blowing the treatment gas axially upwardly into the central space between the side walls to contact the film of mixture and form a partially treated intermediate product;
   (b) collecting the intermediate product running down the side walls and spraying the intermediate product downwardly into the central space in contact with said flow of treatment gas as an atomized spray having a pattern shaped to occupy said central space within the chamber while being maintained out of contact with said film running down the side walls to form a treated product;
   (c) establishing a high agglomerating potential emanating axially from the center of said spray pattern to agglomerate solids therein;
   (d) and collecting said treated product from said central space separately from said film.

2. The method as claimed in claim 1, wherein said solids include combustible particles and wherein the method further includes introducing a flame within said central space in the path of said treatment gas and said atomized spray to burn said combustible particles and heat said film to increase evaporation of the liquid therein.

3. The method as claimed in claim 2, wherein said spray is axially downwardly directed in counterflow against said treatment gas.

4. Apparatus for heat treating a mixture of solids contained within a liquid by contacting the mixture with a flow of treatment gas, the apparatus comprising:
   (a) a treatment chamber having side walls including downwardly diverging side wall portions surrounding a central axis of the chamber;
   (b) a first mixture inlet at the top of said side wall portion and including annular means for forming a film of the mixture on the diverging side wall portions, the film running down the side walls;
   (c) outlet means connected with the side walls and operative to collect an intermediate enriched mixture descending from the side walls;
   (d) a second mixture inlet at the top of said side wall portions disposed within said annular film-forming means and including spraying means having a spraying pattern directed axially downwardly in the chamber and shaped to remain out of contact with the side portions and walls;
   (e) means operative to introduce said intermediate mixture from said outlet means into said second inlet;
   (f) means for blowing said treatment gas upwardly into said chamber into contact with said film and said spray pattern; and
   (g) hopper means in the chamber below the spray pattern and disposed thereopposite and operative to separate sprayed solids from said film and collect the solids and conduct them outside the chamber.

5. Apparatus as claimed in claim 4, wherein said means for blowing gas has an outlet axially located in the chamber, and wherein said apparatus further includes ignition burner means disposed coaxially with said blowing means and opposite said spraying means in the path of said solids.

6. Apparatus as claimed in claim 4, and further including second burner means located adjacent to said ignition burner means and connected to receive and burn a part of said intermediate enriched mixture within said chamber.

7. Apparatus as claimed in claim 6, wherein said ignition burner and said second burner are coaxially located in the outlet of the means for blowing gas.

8. Apparatus as claimed in claim 4, and further including high-voltage electrode means extending downwardly into the chamber beneath said inlets and terminating above said hopper means and said gas blowing means, and operative to agglomerate said solids.

9. Apparatus as claimed in claim 4, wherein said gas blowing means comprises a pipe extending upwardly into said chamber through the hopper means, the pipe being located concentric with the axis of the chamber to avoid rotation of the gas flowing thereinto.

* * * * *